(12) United States Patent
Kim et al.

(10) Patent No.: US 8,701,522 B2
(45) Date of Patent: Apr. 22, 2014

(54) OPERATION MODE PENDANT TYPE ADJUSTMENT PEDAL APPARATUS

(75) Inventors: Eunsik Kim, Daegu (KR); Yangrae Cho, Hwaseong-si (KR); Jongsang Noh, Ulsan (KR); Jonggeun Cha, Ulsan (KR); Hojong Oh, Busan (KR); Donghwan Kim, Ulsan (KR)

(73) Assignees: Hyundai Motor Company, Seoul (KR); Kia Motors Corporation, Seoul (KR); Donghee Industrial Co., Ltd., Ulsan (KR)

(*) Notice: Subject to any disclaimer, the term of this patent is extended or adjusted under 35 U.S.C. 154(b) by 374 days.

(21) Appl. No.: 12/876,865

(22) Filed: Sep. 7, 2010

(65) Prior Publication Data

US 2011/0132134 A1    Jun. 9, 2011

(30) Foreign Application Priority Data

Dec. 4, 2009  (KR) ........................ 10-2009-0119574

(51) Int. Cl.
  *B60K 26/02*  (2006.01)
  *G05G 1/40*  (2008.04)
  *G05G 1/44*  (2008.04)

(52) U.S. Cl.
  USPC ................... 74/514; 74/512; 74/513; 74/560

(58) Field of Classification Search
  USPC .......................................... 74/512–514, 560
  See application file for complete search history.

(56) References Cited

U.S. PATENT DOCUMENTS

| | | | |
|---|---|---|---|
| 1,384,251 A * | 7/1921 | Hyman | 74/564 |
| 5,632,183 A | 5/1997 | Rixon et al. | |
| 6,364,047 B1 * | 4/2002 | Bortolon | 180/334 |
| 6,542,793 B2 * | 4/2003 | Kojima et al. | 701/1 |
| 6,962,094 B2 | 11/2005 | Porter et al. | |
| 2001/0020398 A1 * | 9/2001 | Erikson et al. | 74/89.36 |
| 2004/0259687 A1 * | 12/2004 | Ritter et al. | 477/187 |
| 2009/0223319 A1 * | 9/2009 | Choi | 74/512 |
| 2010/0083789 A1 * | 4/2010 | Osawa et al. | 74/513 |

FOREIGN PATENT DOCUMENTS

| | | | | |
|---|---|---|---|---|
| JP | 1-92537 A | 4/1989 | | |
| JP | 2002-287837 A | 10/2002 | | |
| JP | 2003-335146 A | 11/2003 | | |
| JP | 2004-155375 | * | 6/2004 | ............ B60K 26/02 |
| JP | 2007-237824 A | 9/2007 | | |

(Continued)

OTHER PUBLICATIONS

Translation of JP 2002-287837, obtained on Oct. 25, 2012.*

(Continued)

*Primary Examiner* — Alan B Waits
*Assistant Examiner* — Brian McGovern
(74) *Attorney, Agent, or Firm* — Morgan, Lewis & Bockius LLP

(57) ABSTRACT

A pendant type adjustment pedal apparatus includes an adjustment accelerator pedal that adjust a pedal clearance by the rotation of a motor, and an adjustment brake pedal that receives the rotation of motor through a rotary drive cable. Accordingly, convenience in adjusting a pedal clearance is provided, and particularly, adjustment accelerator pedal achieves a vibration mode in addition to a foot effort mode, which is an eco mode, by an electric mode generating device, such as a solenoid or a linear motor. Therefore, it is possible to improve fuel efficiency and to provide a danger recognition function using an accelerator pedal.

6 Claims, 14 Drawing Sheets

(56) References Cited

FOREIGN PATENT DOCUMENTS

| KR | 1999-0059716 A | 7/1999 |
|----|----------------|--------|
| KR | 10-0649166 B1 | 11/2006 |
| KR | 2007-137152 A | 6/2007 |
| KR | 10-0844559 B1 | 7/2008 |
| KR | 10-0879061 B1 | 1/2009 |

OTHER PUBLICATIONS

Translation of JP 2007-137152, obtained on Oct. 25, 2012.*
Translation of JP 2004-155375, obtained Jul. 3, 2013.*
Translation of JP 2007-137152, obtained Jul. 3, 2013.*

* cited by examiner

FIG.3
(A)
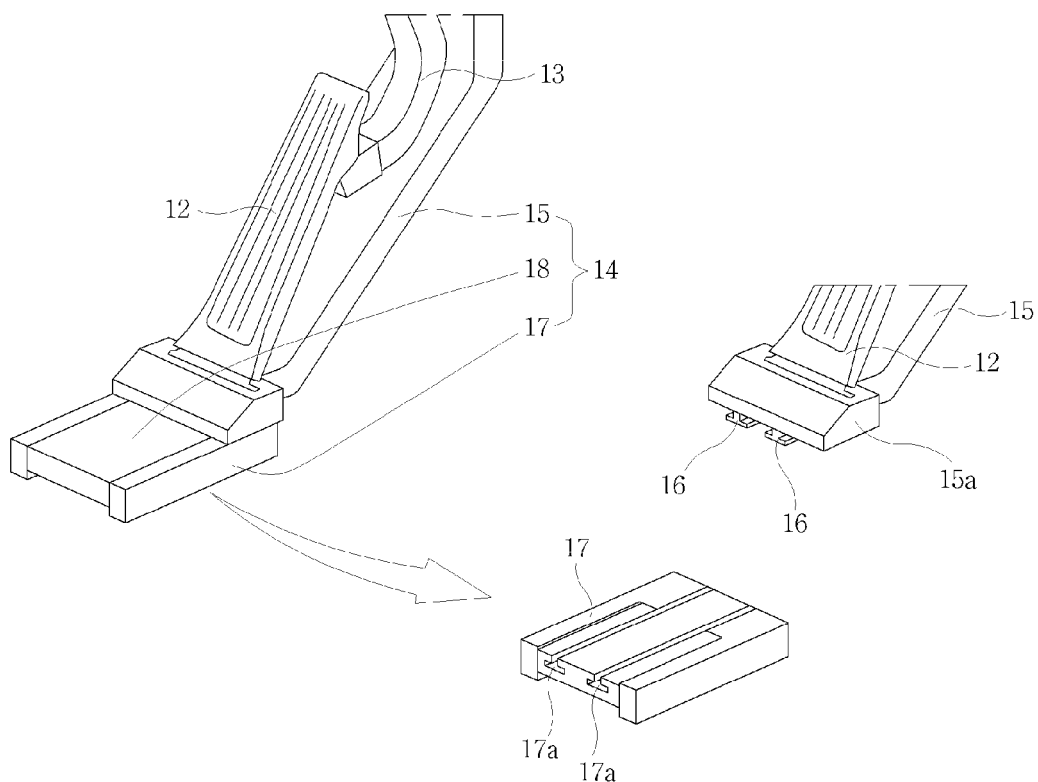
(B)
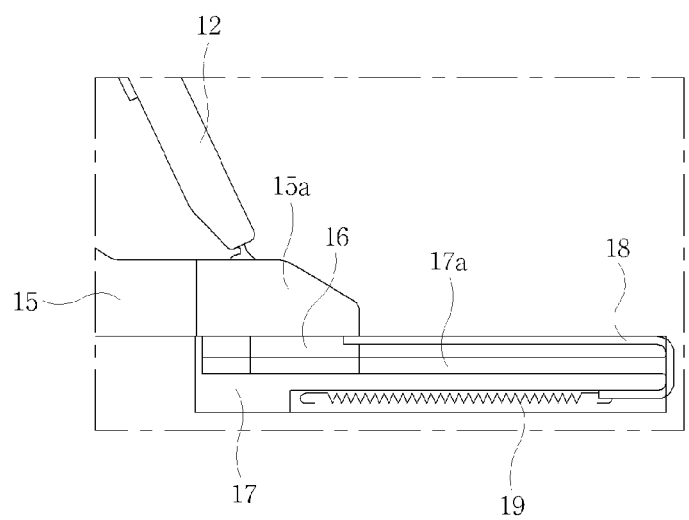

OPERATION MODE PENDANT TYPE ADJUSTMENT PEDAL APPARATUS

CROSS-REFERENCE TO RELATED APPLICATIONS

The present application claims priority to Korean Patent Application Number 10-2009-0119574 filed Dec. 4, 2009, the entire contents of which application is incorporated herein for all purposes by this reference.

BACKGROUND OF THE INVENTION

1. Field of the Invention

The present invention relates to an accelerator pedal and a brake pedal for a vehicle, and more particularly, to a pendant type adjustment pedal apparatus that can achieve various operation modes of an accelerator pedal.

2. Description of Related Art

The positions of pedals (an accelerator pedal and a brake pedal) for a vehicle are generally fixed. For this reason, in order to fit the pedals to physical characteristics of a driver, clearance is adjusted by pushing or pulling a seat.

However, an adjustment pedal apparatus makes the accelerator pedal interlock with the brake pedal and moves the positions of the pedals by generating power through the operation of a switch. Accordingly, the adjustment pedal apparatus has convenience without inconvenience in pushing or pulling a seat.

Among various methods of improving the fuel efficiency of a vehicle, there is a method of reducing the unnecessary operation of an accelerator pedal. For example, there is an operation mode pedal apparatus that can reduce the number of operations of the accelerator pedal by making a driver feel a reaction, which is different from a foot effort of the accelerator pedal, according to the running condition of a vehicle.

This operation mode is usually called an eco mode. Unlike a normal mode that a driver feels a reaction through a spring when stepping on a pedal, the eco mode is achieved as follows: when a driver steps on a pedal, a reaction having different magnitude is transmitted to a driver by separate power so as to make a driver takes one's foot off from the pedal, thereby improving fuel efficiency.

As an example of a method of applying a reaction by using power in the eco mode, there is a method using a motor and a clutch.

In the eco mode where the motor and the clutch are used as a power source as described above, a stator is electrically magnetized by current that flows in a coil (field coil) wound on the stator. When a rotor including a permanent magnet is rotated, the eco mode makes a driver feel a reaction, which is different from a foot effort, by a force that is transmitted trough a joint so as to prevent the rotation of a clutch disc, so that a driver takes one's foot off from the pedal.

However, if the motor and the clutch are applied to achieve the eco mode as described above, a structure becomes complicated and manufacturing cost is increased due to the increase of the number of components.

Further, the above-mentioned motor and clutch are operated while the rotor and the clutch disc come into contact with or are separated from each other during operation. For this reason, much operation noise is generated.

The information disclosed in this Background section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an operation mode pendant type adjustment pedal apparatus that provides convenience in adjusting a pedal clearance to a driver, improves fuel efficiency and provides a danger recognition function using an accelerator pedal by achieving a vibration mode in addition to a foot effort mode, which may be an eco mode of an accelerator pedal.

Further, various aspects of the present invention provide an operation mode pendant type adjustment pedal apparatus of which the structure is simplified and manufacturing cost is reduced by using the rotation of a motor for the adjustment of a pedal clearance and using the operation of a solenoid or a linear motor for an eco mode of an accelerator pedal.

Furthermore, various aspects of the present invention provide an operation mode pendant type adjustment pedal apparatus that can simply form an accelerator pedal and a brake pedal by connecting a motor, which adjusts a pedal clearance of an accelerator pedal, to an adjustment brake pedal by a rotary cable for transmitting power.

An aspect of the present invention provides a pendant type adjustment pedal apparatus including an adjustment accelerator pedal. The adjustment accelerator pedal includes an accelerator pedal and an electric mode generating device. The accelerator pedal approaches or is separated from a driver by converting the rotation of a motor driven in accordance with a switch signal, into the linear movement, and the electric mode generating device achieves at least one mode where a reaction not using the return spring is applied to the accelerator pedal in addition to a normal mode where a foot effort is applied to the accelerator pedal by a return spring.

The mode includes a foot effort mode where the electric mode generating device applies a reaction to the accelerator pedal in one direction and a vibration mode where the electric mode generating device applies a vibration reaction to the accelerator pedal in both directions.

The adjustment accelerator pedal further includes an adjuster that supports the accelerator pedal and slides linearly; a lead screw that converts the rotation of the motor into linear movement in an axial direction by a worm engaged with a worm gear; a mounting housing that fixes the adjuster and the electric mode generating device, receives a load from the lead screw in the axial direction, may be moved linearly, and moves the adjuster in the same direction; and a sensor housing that includes sensors communicating with the electric mode generating device and an ECU.

The adjuster includes a slider that may be fixed to the mounting housing without restricting the movement of the accelerator pedal, a guide block that guides the sliding movement of the slider in a front-rear direction, and an elastic return spring that applies a return force to the slider.

The slider includes at least one guide protrusion, guide channels for guiding the movement of the guide protrusion are formed at the guide block, and an interlocking plate, which may be moved together with the slider, may be fixed to the return spring.

Each of the guide protrusion and the guide channel includes a middle portion and a lower end portion which extends from the middle portion toward both sides.

The mounting housing further includes a load input block that may be threadedly engaged with the end of the lead screw so as to be moved together with the lead screw, and includes at least one support pin on both sides thereof, and the support pin may be exposed to the outside through at least one guide slot that may be formed in a linear shape at both side plates of a main housing in which the load input block is positioned.

The electric mode generating device may be a solenoid or a linear motor.

The solenoid includes both a normal coil and a reverse coil, or includes either a normal coil or a reverse coil.

The operation mode pendant type adjustment pedal apparatus further includes a return spring that may be provided between the accelerator pedal and the electric mode generating device and may be pressed and compressed by an upper end portion of the accelerator pedal operated about an hinge shaft; and a load transmission unit that applies a force to the electric mode generating device through the upper end portion of the accelerator pedal and receives a force from the electric mode generating device.

The load transmission unit includes a load applying end that forms an upper end portion, which may be positioned above the hinge shaft, of the pedal arm and may be pushed through the pressing of a foot plate; a load transmission rod that may be fixed to the load applying end and transmits the movement of the load applying end to the electric mode generating device; and a return spring that may be pressed by the load applying end and transmits a spring reaction to the pedal arm.

The operation mode pendant type adjustment pedal apparatus further includes an interlink that may be provided between the load applying end and the load transmission rod and adjusts a ratio L1/L2 of a distance L1 between the hinge shaft and the load transmission rod to a distance L2 between the hinge shaft and the load applying end.

Both ends of the interlink with respect to the hinge shaft are bent to face each other.

According to various aspects of the invention, it is possible to conveniently perform the adjustment of a pedal clearance by using rotational power of a motor, and to improve fuel efficiency by providing an eco mode to an accelerator pedal.

Further, according to various aspects of the invention, it is possible to notify a driver of a dangerous running state through the accelerator pedal by adding a vibration mode to the mode of the accelerator pedal. Accordingly, it is possible to obtain an advantage of significantly improving running safety.

Furthermore, according to various aspects of the invention, the eco mode of the accelerator pedal is achieved using a solenoid or a linear motor. Accordingly, it is possible to obtain advantages of further simplifying structure and reducing manufacturing cost.

Moreover, according to various aspects of the invention, it is possible to obtain an advantage of simply forming an accelerator pedal and a brake pedal by connecting the brake pedal to the motor of the accelerator pedal by a rotary cable for transmitting power to the motor.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 3 is a view of the sliding structure of the accelerator pedal of FIG. 2.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
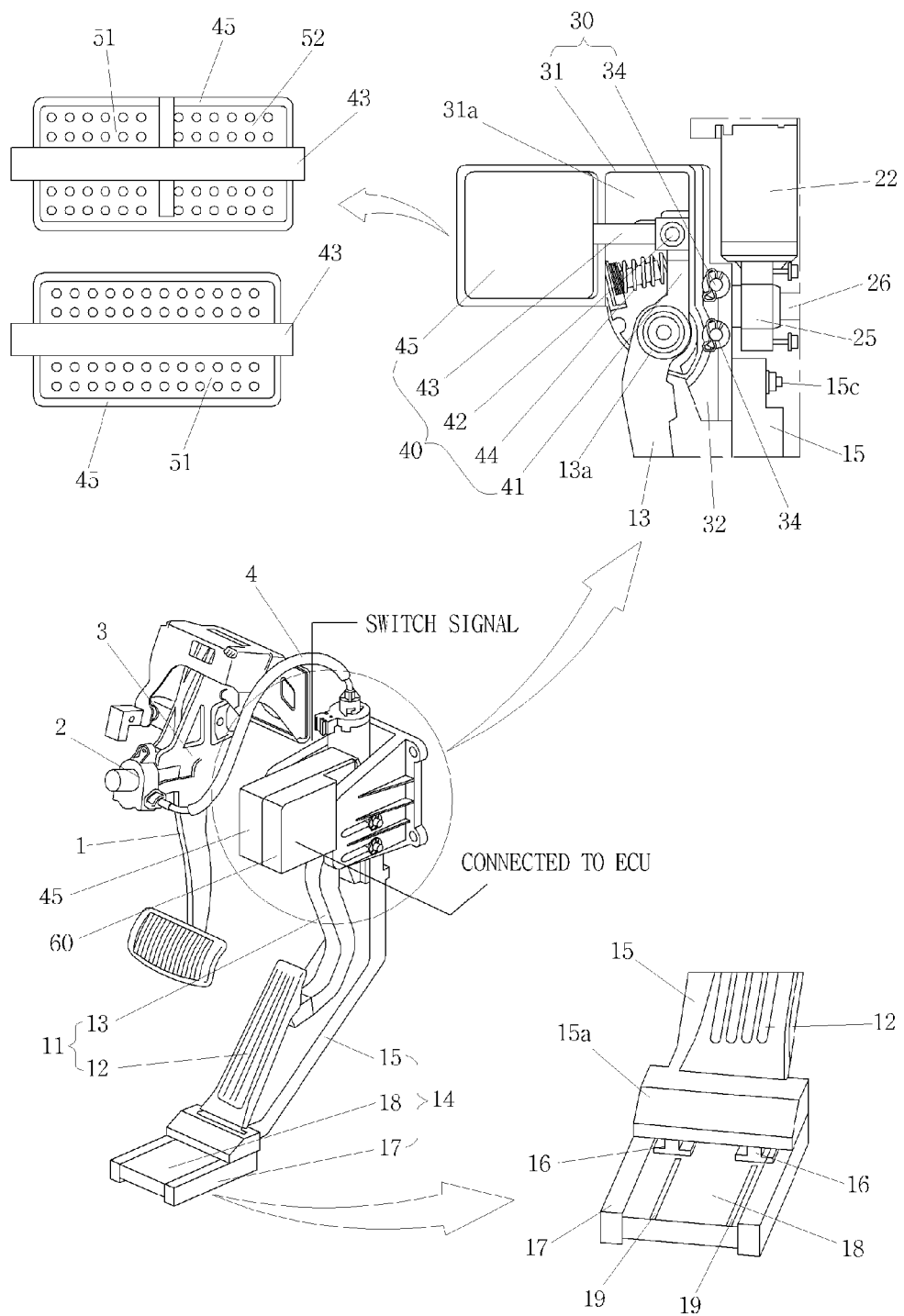
FIG. 1 is a view showing the configuration of an exemplary operation mode pendant type adjustment pedal apparatus according to the invention.

FIG. 1 is a view showing the structure of an operation mode pendant type adjustment pedal apparatus according to the invention. The pendant type adjustment pedal apparatus allows a driver to conveniently adjust clearance between a pedal and the driver by the rotational power of a motor 22; further improves the fuel efficiency of an accelerator pedal 11 with an eco mode, which is achieved on accelerator pedal 11 by a solenoid or a linear motor; and significantly improves the running safety of a vehicle by notifying a driver of a dangerous running state of a vehicle through accelerator pedal 11 by a vibration mode that is newly added to accelerator pedal 11.

The invention will be described about a pendant type adjustment pedal apparatus, but may be applied in the same manner regardless of whether the type of a pedal is a pendant type, a pendant-organ type, a box-organ type, or a pendant adjustment eco organ type.

The pendant type adjustment pedal apparatus according to various embodiments includes an adjustment brake pedal 1 that receives the rotation of motor 22 through a rotary drive cable 4 and adjusts clearance between the adjustment brake pedal and a driver. The adjustment accelerator pedal apparatus adjusts clearance between the adjustment accelerator pedal and a driver like adjustment brake pedal 1 and achieves a foot effort mode and a vibration mode, which are subdivided from the eco mode, by using an electric mode generating device 45, such as a solenoid or a linear motor.

Adjustment brake pedal 1 adjusts clearance between the adjustment brake pedal and a driver by using an adjustment mechanism 3 that is operated by drive cable 4 receiving the rotation of motor 22, and a pedal driver 2 that is operated by adjustment mechanism 3.

Adjustment mechanism 3 and pedal driver 2 are common structures that are applied to a manner using the torque of motor 22.

In various embodiments, the adjustment accelerator pedal apparatus includes an accelerator pedal 11, an adjuster 14 that moves accelerator pedal 11 to the front and rear sides of a driver, a power generator 20 that generates the movement of adjuster 14 by using the torque of motor 22 driven in accordance with a switch signal selected by a driver, a moving block 30 that receives a force generated form power generator 20 and moves adjuster 14, a pedal reactor 40 that provides a foot effort reacting to the movement of accelerator pedal 11 and achieves the movement of accelerator pedal 11 so as to correspond to the foot effort mode or the vibration mode, and a sensor block 60 that generates and receives a signal.

Accelerator pedal 11 my be a pendant type pedal in that it may be rotated about an upper end portion thereof that is connected using a hinge, when being pressed.

Adjuster 14 has clearance not to restrict movement according to the degree of pressing of accelerator pedal 11 and makes accelerator pedal 11 slide in a front-rear direction, so that the movement for adjusting clearance between a driver's foot and accelerator pedal 11 is achieved.

Power generator 20 is fixed to a vehicle body so as not to be moved, and includes a main housing 21. The main housing has a cavity in both side portions where at least one guide slot is formed. Motor 22, a worm gear 24 and a worm 25 that convert the torque of motor 22 to a linear force, a lead screw 26, and the like are mounted in the cavity of main housing 21.

A force for supporting moving block 30 is generated by a support pin 34 that protrude from the guide slot formed at main housing 21, and the movement of support pin 34 in the front-rear direction is stably achieved by main housing 21 including the guide slot.

Pedal reactor 40 is provided with electric mode generating device 45, such as a solenoid or a linear motor, and electric mode generating device 45 provides a reaction corresponding to the movement of accelerator pedal 11. The pedal reactor moves accelerator pedal 11 in accordance with the normal mode, the foot effort mode, or the vibration mode that may be selected by a driver.

Sensor block 60 and adjuster 14 are formed separately from each other, and are connected to each other by fastener such as bolts and nuts. Alternatively, the sensor block and adjuster 14 may be integrally formed with each other.

Figure 2:
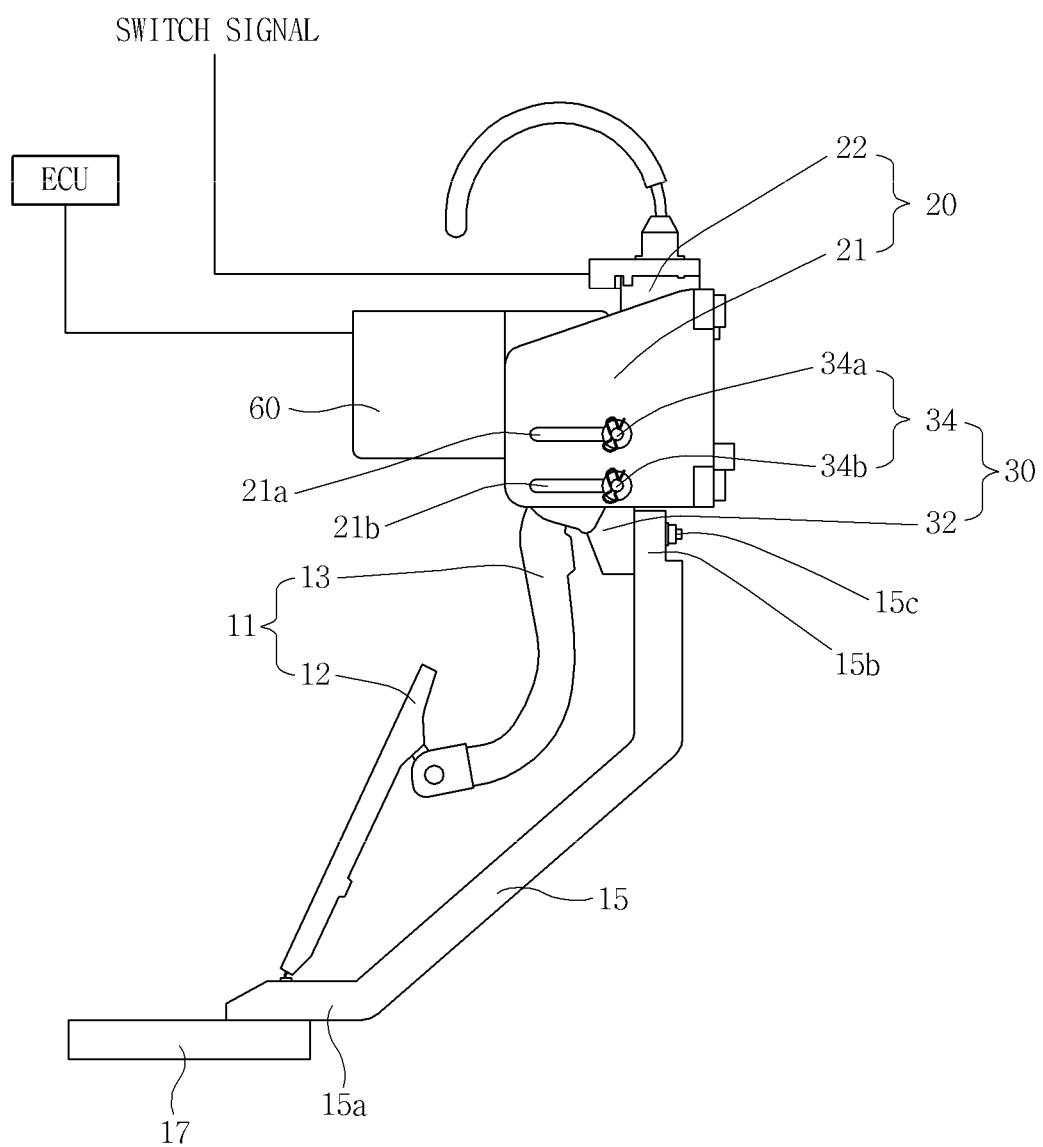
FIG. 2 is a view showing the combining of an exemplary accelerator pedal of the operation mode pendant type adjustment pedal apparatus according to the invention.

FIG. 2 is a view showing the combining of the accelerator pedal that is combined with the adjuster according to various embodiments.

As shown in the drawing, accelerator pedal 11 includes a foot plate 12 that is stepped on by a driver, and a pedal arm 13. Pedal arm 13 is fixed to foot plate 12, and is operated like a seesaw about a hinge shaft 13a that is provided at the upper end of pedal arm 13.

The portion of pedal arm 13, which is formed at the upper portion of hinge shaft 13a, further extends in various embodiments, so that the pedal arm achieves an operation for transmitting the movement of pedal arm 13 to pedal reactor 40 from the upper side of hinge shaft 13a.

Adjuster 14 includes a slider 15 that is positioned behind accelerator pedal 11 and has clearance not to restrict the rearward movement of pedal arm 13, a guide block 17 that guides the sliding movement of slider 15 in the front-rear direction, and a return spring 19 that applies a elastic return force to slider 15.

A guider 15a is formed at the lower end of slider 15, a portion of slider 15 facing accelerator pedal 11 is combined, a fixed upper end 15b is formed at the upper end of the slider and is fixed to moving block 30 by a fixing bolt 15c. Accordingly, slider 15 moves together with moving block 30, which is moved by power generator 20, so that clearance between a driver and accelerator pedal 11 is adjusted.

FIG. 3A is a view of the structure of the sliding movement of the slider and the guide block according to various embodiments in the front-rear direction.

As shown in the drawing, at least one guide protrusion 16 is formed at slider 15 and a guide channel 17a is formed at guide block 17 so as to guide the movement of guide protrusion 16. Accordingly, slider 15 slides on guide block 17 in the front-rear direction.

Guide protrusion 16 and guide channel 17a may have various cross-sections. However, in various embodiments, each of the guide protrusion and the guide channel includes a middle portion having a predetermined height and a lower end portion which extends from the middle portion toward both sides.

In various embodiments, two guide protrusions 16 and two guide channels 17a make a pair, respectively, so that the slider slides more stably in the front-rear direction.

FIG. 3B shows the combining structure of the slider and the guide block according to various embodiments.

As shown in the drawing, the combining structure of slider 15 and guide block 17, which are applied to various embodiments, further includes an interlocking plate 18 that is elastically supported by a return spring 19.

One side of interlocking plate 18 is combined with guider 15a of slider 15 or guide protrusion 16, and the other side thereof is fixed to return spring 19 that is bent and inserted into guide channel 17a. Return spring 19 is stretched during the movement of slider 15 and is compressed during the return of slider 15. Accordingly, the return spring provides an elastic return force to slider 15.

The width of interlocking plate 18 has a width smaller than that of guide block 17. Accordingly, when being assembled, the interlocking plate is not deviated from guide block 17 and is fitted to the grooves formed on both sides of guide block 17 within the width of the guide block, so that the more stable sliding movement is achieved.

Figure 4:
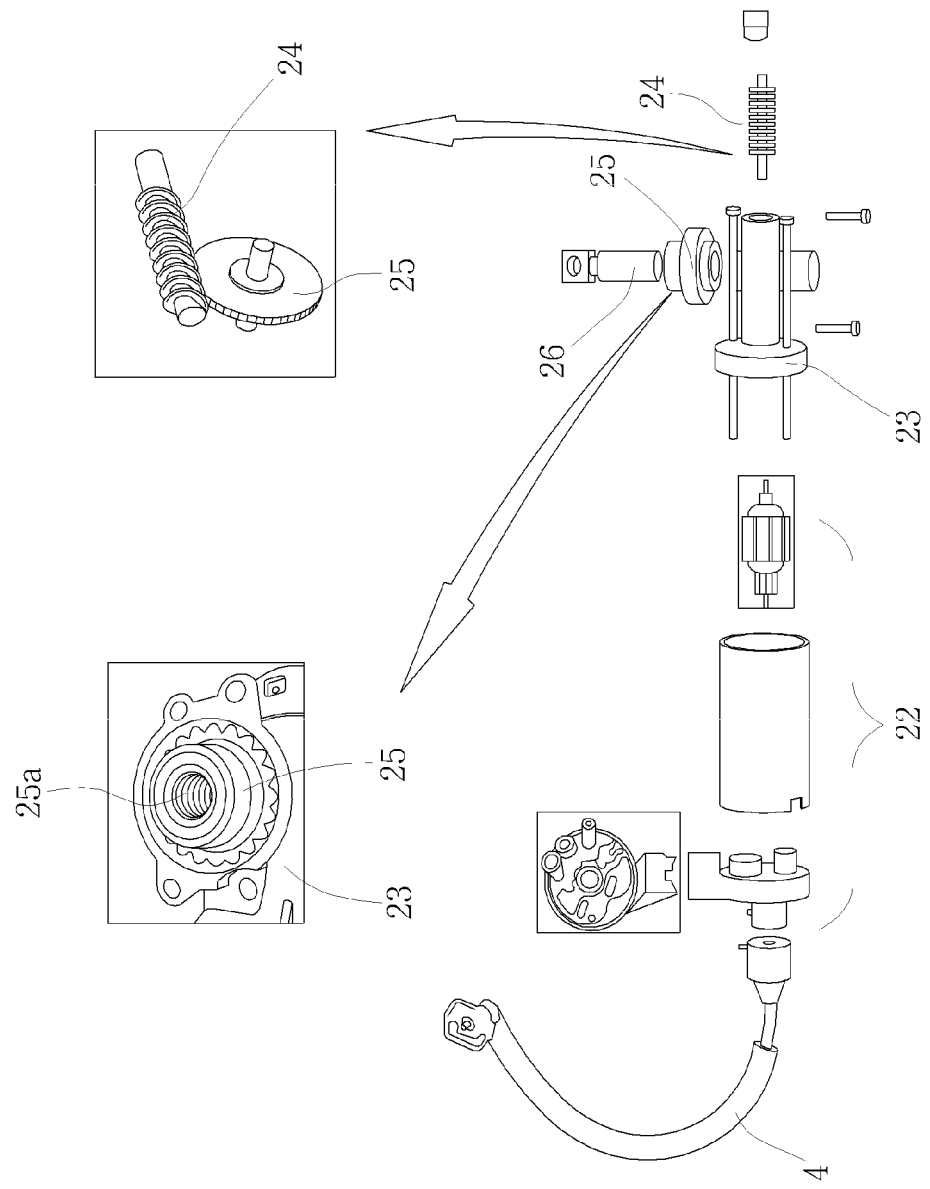
FIG. 4 is a view showing the configuration of an exemplary motor of an exemplary accelerator pedal according to the invention.

FIG. 4 shows a power generator 20 according to various embodiments.

As shown in the drawing, power generator 20 includes a motor housing 23 receiving motor 22, which is connected to drive cable 4 connected to adjustment brake pedal 1 and driven in accordance with an operating switch signal; worm gear 24 and worm 25 that convert the torque of motor 22 by using motor housing 23, and lead screw 26 that is engaged with a thread 25a formed at a shaft hole of worm 25 and linearly moves in the front-rear direction by the rotation of worm 25.

In various embodiments, worm gear 24 is directly connected to motor 22, and lead screw 26 passes through worm 25 and is orthogonal to worm gear 24.

Figure 5:
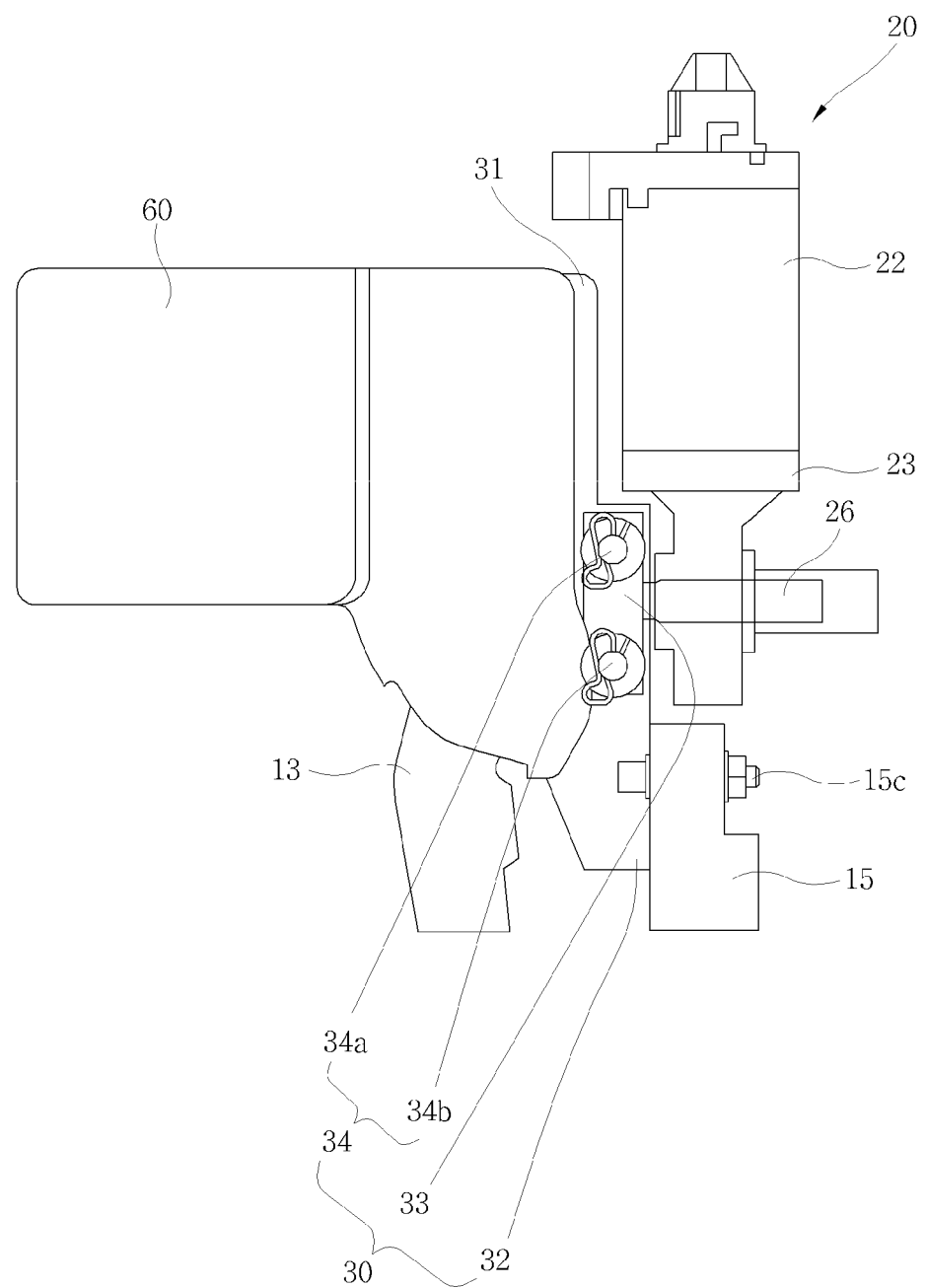
FIG. 5 is an assembled view of FIG. 4.

Referring to FIG. 5, lead screw 26 is orthogonal to motor 22 that is vertically erected, so that power generator 20 received in the inner space of main housing 21 can be made more compact.

In various embodiments, moving block 30 includes a mounting housing 31 which includes an extension bracket 32 extending below a pedal position space 31a and to which a fixing bolt 15c passing through slider 15 is fastened; a load input block 33 that is positioned above extension bracket 32 and receives an axial force of lead screw 26 in the front-rear direction; and at least one support pin 34 that is fixed to load input block 33.

Pedal position space 31a of mounting housing 31 is used as a space where the upper end portion of pedal arm 13 of accelerator pedal 11 is received and pedal reactor 40 achieving the operation related with pedal arm 13 is installed.

Figure 6:
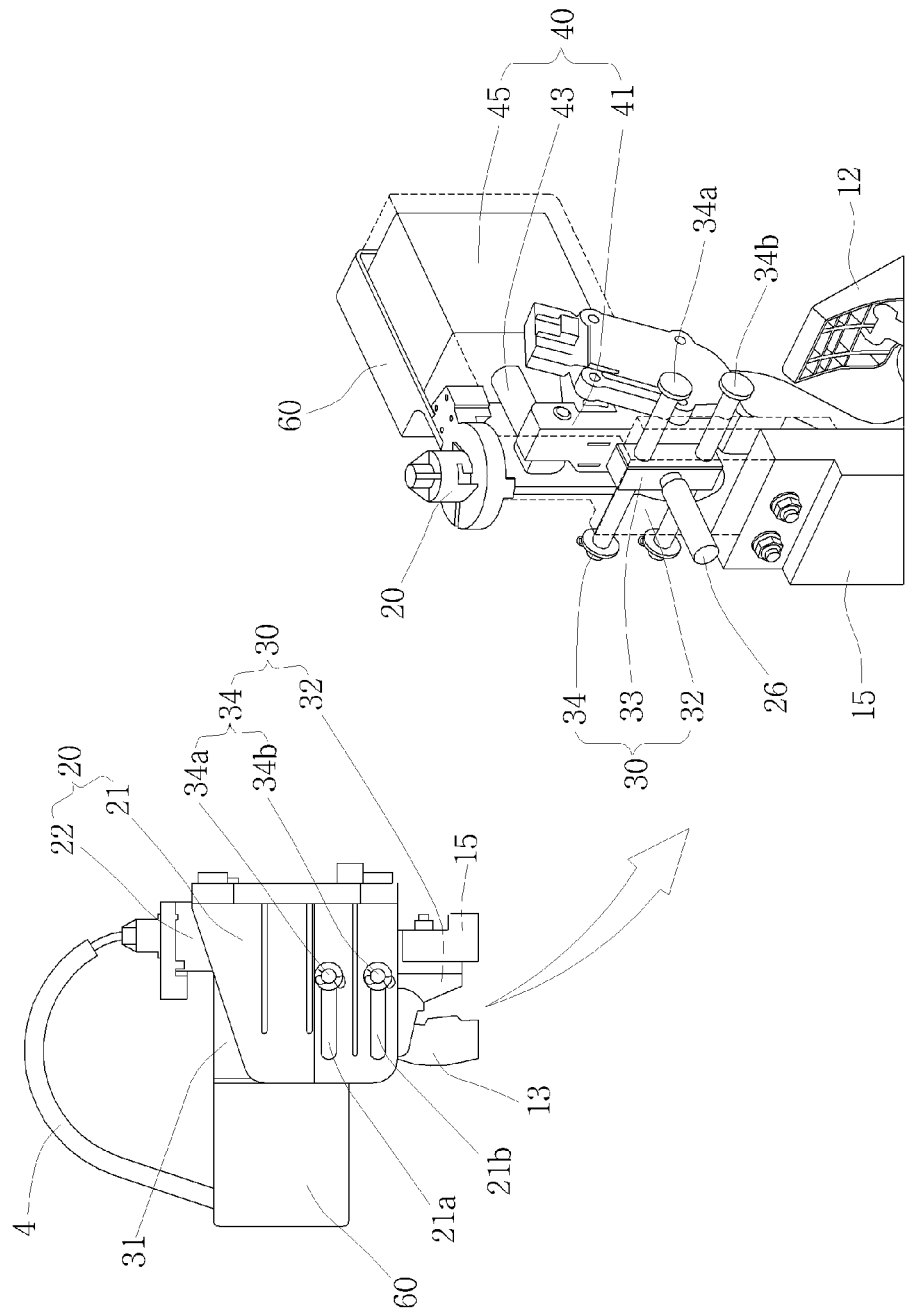
FIG. 6 is a configuration view showing the sliding on the motor of FIG. 4.

FIG. 6 shows the structure of power generator 20 and moving block 30 according to various embodiments.

As shown in the drawing, when moving block 30 is covered with main housing 21, a portion of moving block 30 facing extension bracket 32 fixing slider 15 is partially exposed to the outside. Accordingly, it is possible to more easily perform a work handling fixing bolt 15c during assembly and maintenance.

Load input block 33 is moved forward together with the lead screw when lead screw 26 is moved forward and is moved backward together with the lead screw when lead screw 26 is moved backward. Accordingly, load input block 33 directly receives a force from lead screw 26 and transmits a force used for adjusting the clearance between the pedal and a driver.

Load input block 33 is threadedly engaged with the end of lead screw 26 in various embodiments. Accordingly, when lead screw 26 is moved forward and backward, the load input block and lead screw 26 can move together with each other.

Further, since support pins 34 are threadedly engaged with both sides of load input block 33, it may be possible to perform assembly and maintenance.

In various embodiments, two support pins 34 is formed of a pair of (first and second) support pins 34a and 34b, and first and second support pins 34a and 34b pass through a pair of (first and second) guide slots 21a and 21b that is formed at main housing 21.

When moving block 30 is assembled with power generator 20, first and second support pins 34a and 34b of moving block 30 protrude to the outside through first and second guide slot 21a and 21b that are formed at main housing 21. Accordingly, a force for supporting moving block 30 can be generated, and the movement of moving block 30 in the front-rear direction can be stably guided along first and second guide slots 21a and 21b.

Furthermore, since first and second guide slot 21a and 21b, which guide first and second support pins 34a and 34b, are formed in a linear shape, it may be possible to more stably achieve the linear movement for adjust a pedal clearance.

In various embodiments, referring the FIG. 1, pedal reactor 40 is provided in pedal position space 31a formed in mounting housing 31 of moving block 30 and is fixed by hinge shaft 13a so as to be connected to the upper end portion of pedal arm 13 that transmits the movement of accelerator pedal 11.

For this purpose, pedal reactor 40 includes a load applying end 41 that forms the upper end portion of pedal arm 13 so as to perform an angular motion about hinge shaft 13a by the movement of pedal arm 13; a load transmission rod 43 that is fixed by a connection pin 42 so as to be interlocked with load applying end 41; a return spring 44 that is compressed so as to generate a return force during the angular motion of load applying end 41; and electric mode generating device 45 that receives the movement of load transmission rod 43 or transmits the movement to transmission rod 43.

A solenoid or a linear motor has been applied as electric mode generating device 45 in various embodiments, but various devices having the same function may be used.

If electric mode generating device 45 is a solenoid, the solenoid may include both a normal coil 51 and a reverse coil 52 or may include one coil such as a normal coil 51.

The power of electric mode generating device 45 including both normal coil 51 and reverse coil 52 controls a force, which is applied to accelerator pedal 11, by the adjustment of the current applied to the respective coils, and the device including only normal coil 51 controls a force, which is applied in a direction opposite to the operation of accelerator pedal 11, by the supply of current.

Figure 7:
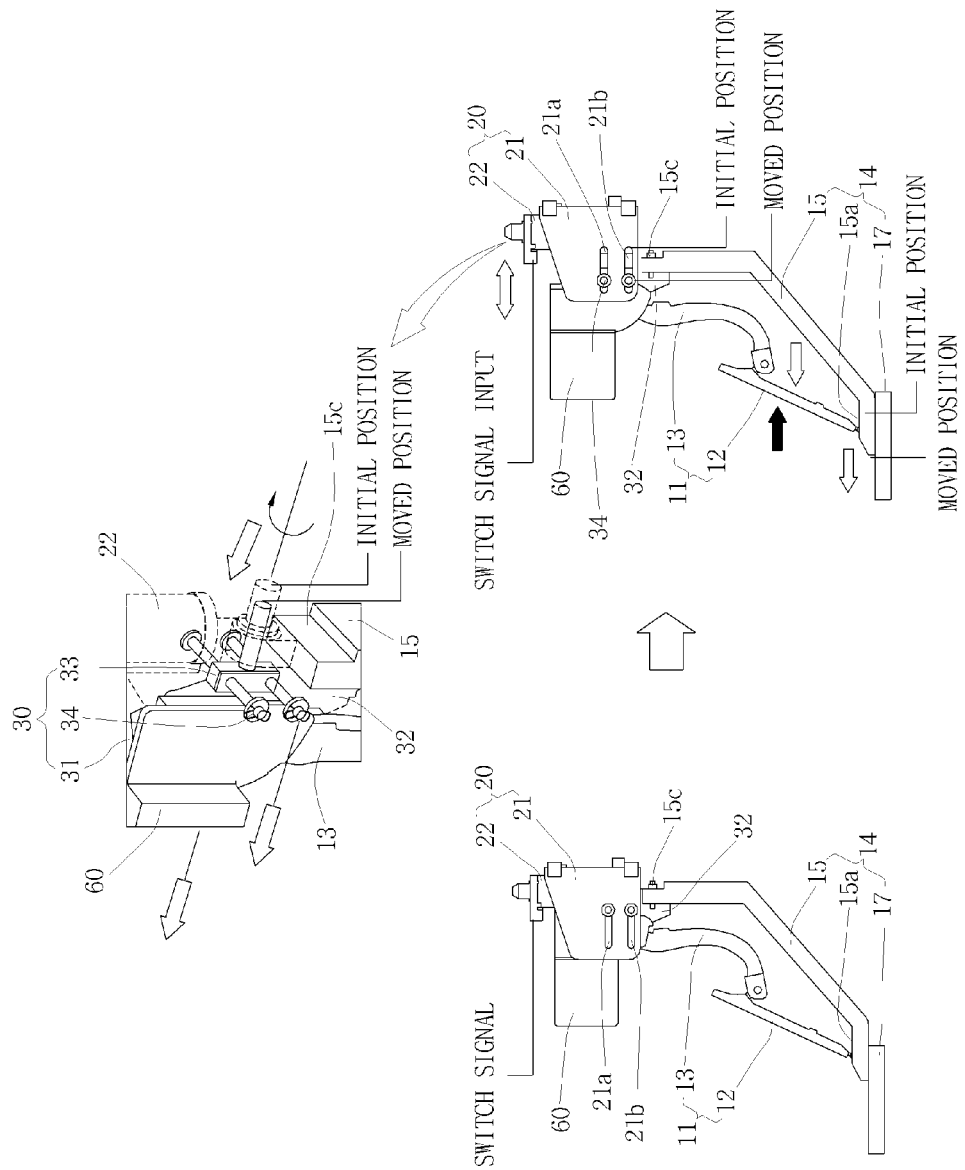
FIG. 7 is a view showing a clearance adjusting operation of an exemplary accelerator pedal according to the invention.

FIG. 7 shows the operation for adjusting clearance of the accelerator pedal using the accelerator pedal apparatus according to various embodiments.

As shown in the drawing, the rotation of motor 22, which is driven by the request of a driver, is converted into the linear movement of lead screw 26 through worm gear 24 and worm 25. Further, accelerator pedal 11 approaches or is separated from a driver by the linear movement of lead screw 26, so that a pedal clearance is adjusted.

Since various embodiments also include adjustment brake pedal 1, drive cable 4 receives the torque of motor 22 and operates adjustment mechanism 3 and pedal driver 2, so that the brake pedal clearance adjustment of a driver is achieved like the accelerator pedal.

If the pedal approaches a driver by the adjustment, a load is applied to load input block 33 engaged with lead screw 26 in the same direction when lead screw 26 is moved forward while being rotated in a clockwise direction by the rotation of motor 22.

A force, which is applied to load input block 33 from lead screw 26, is transmitted to mounting housing 31 where a sensor housing 60 and pedal reactor 40 are mounted and slider 15, which is fixed to mounting housing 31 by extension bracket 32, is moved forward in a direction where a force is applied to lead screw 26, so that accelerator pedal 11 approaches a driver.

In this case, first and second support pins 34a and 34b fixed to both sides of load input block 33 are guided by first and second guide slot 21a and 21b of main housing 21, so that the linear movement is achieved more stably.

The forward movement of slider 15 is achieved by guide protrusion 16 corresponding to slider 15 that has movement corresponding to guide channel 17a of guide block 17 fixed to the bottom of a vehicle body.

Referring to FIG. 3B, when guide protrusion 16, which receives the forward force of slider 15, is pushed along guide channel 17a from guide block 17, interlocking plate 18 is pushed together due to the movement of guide protrusion 16 and stretches return spring 19.

When the above-mentioned movement of slider 15 is completed, accelerator pedal 11 approaches a driver as close as the forward movement of slider 15. Accordingly, the adjustment of a pedal clearance is completed.

In contrast, the operation for separating the pedal from a driver makes motor 22 be driven in an opposite direction when the pedal approaches. Accordingly, all the processes are performed reversely.

In this case, return spring 19, which is stretched by the pedal approaching a driver, is compressed again and applies an elastic restoring force to the pedal that is separated from a driver.

Figure 8:
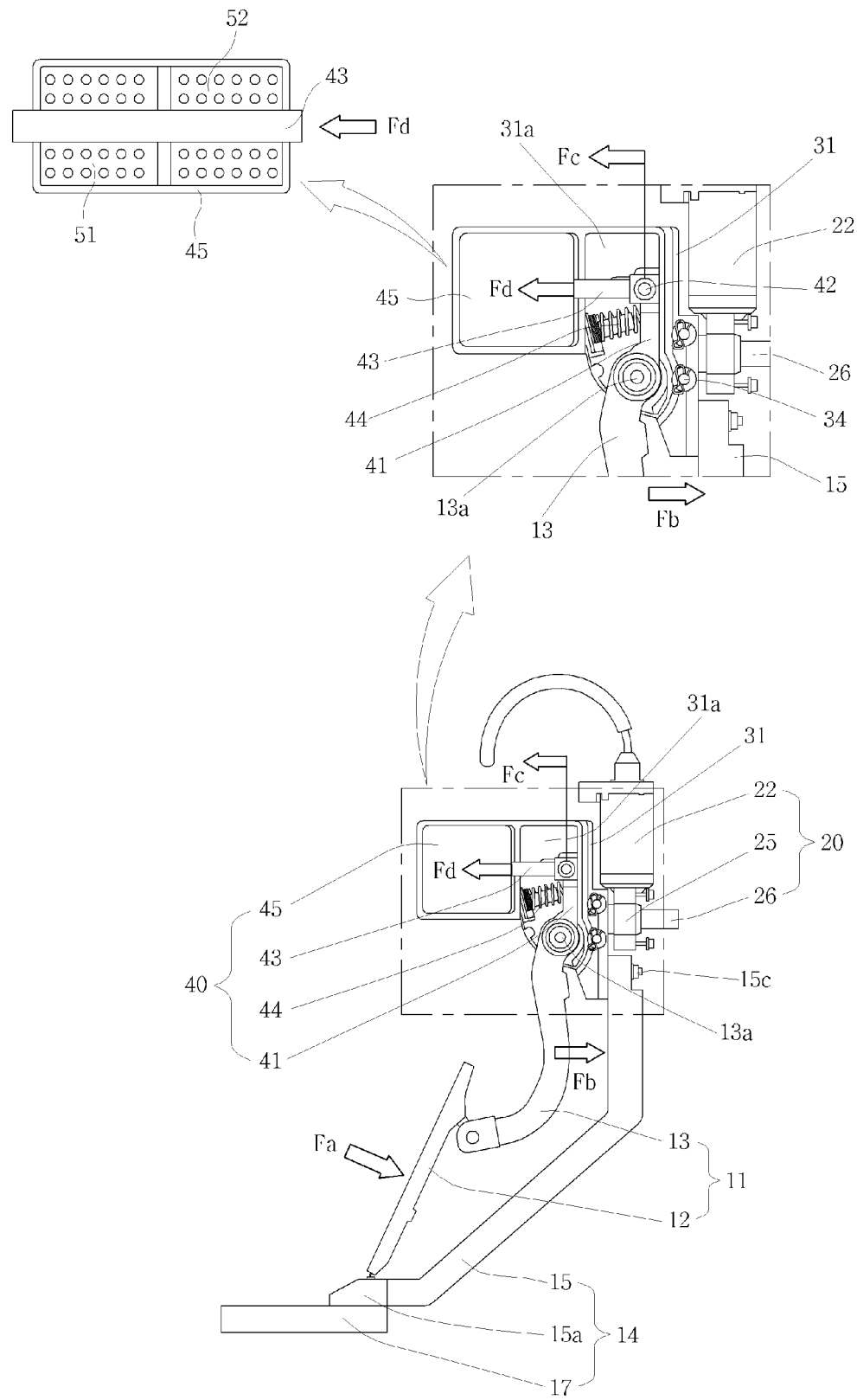
FIG. 8 is a view showing the operation of a normal mode operation of an exemplary accelerator pedal of the operation mode pendant type adjustment pedal apparatus according to the invention.

FIG. 8 shows a normal mode operation of the accelerator pedal apparatus according to various embodiments.

As shown in the drawing, when pedal arm 13 is pushed by a force Fb by pressing foot plate 12 of accelerator pedal 11 by a force Fa, pedal arm 13 is operated like a seesaw about hinge shaft 13a. Accordingly, the upper end portion of the pedal arm is moved in a direction opposite to the lower end portion that is pushed.

Therefore, load applying end 41, which forms the upper end portion of pedal arm 13, pushes load transmission rod 43, which is fixed by connection pin 42, by a force Fc, and load transmission rod 43 transmits a force Fd to electric mode generating device 45.

However, current is not supplied to electric mode generating device 45 in the normal mode operation.

Accordingly, even though receiving force Fd from load transmission rod 43, electric mode generating device 45 generates no force and does not apply a force to accelerator pedal 11.

The return spring 44 applied to various embodiments is compressed according to the angular momentum of load applying end 41 about hinge shaft 13a. Accordingly, when the operation of foot plate 12 is released, return spring 44 applies an elastic return force to load applying end 41, so that pedal arm 13 returns to an original state.

Figure 9:
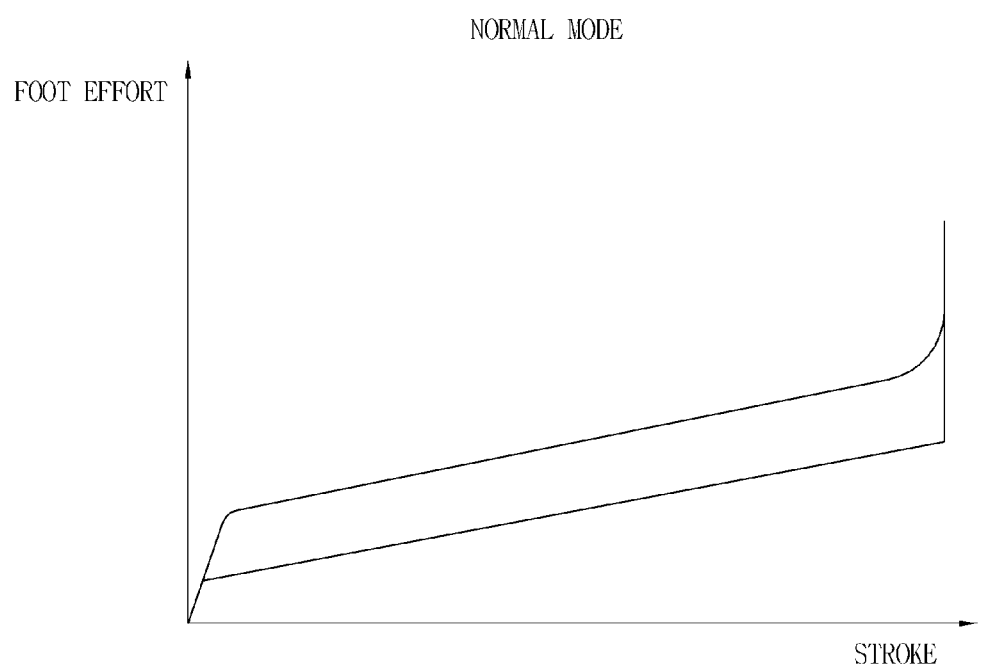
FIG. 9 is a foot effort diagram corresponding to FIG. 8.

A foot effort diagram in the normal mode operation is shown in FIG. 9.

Figure 10:
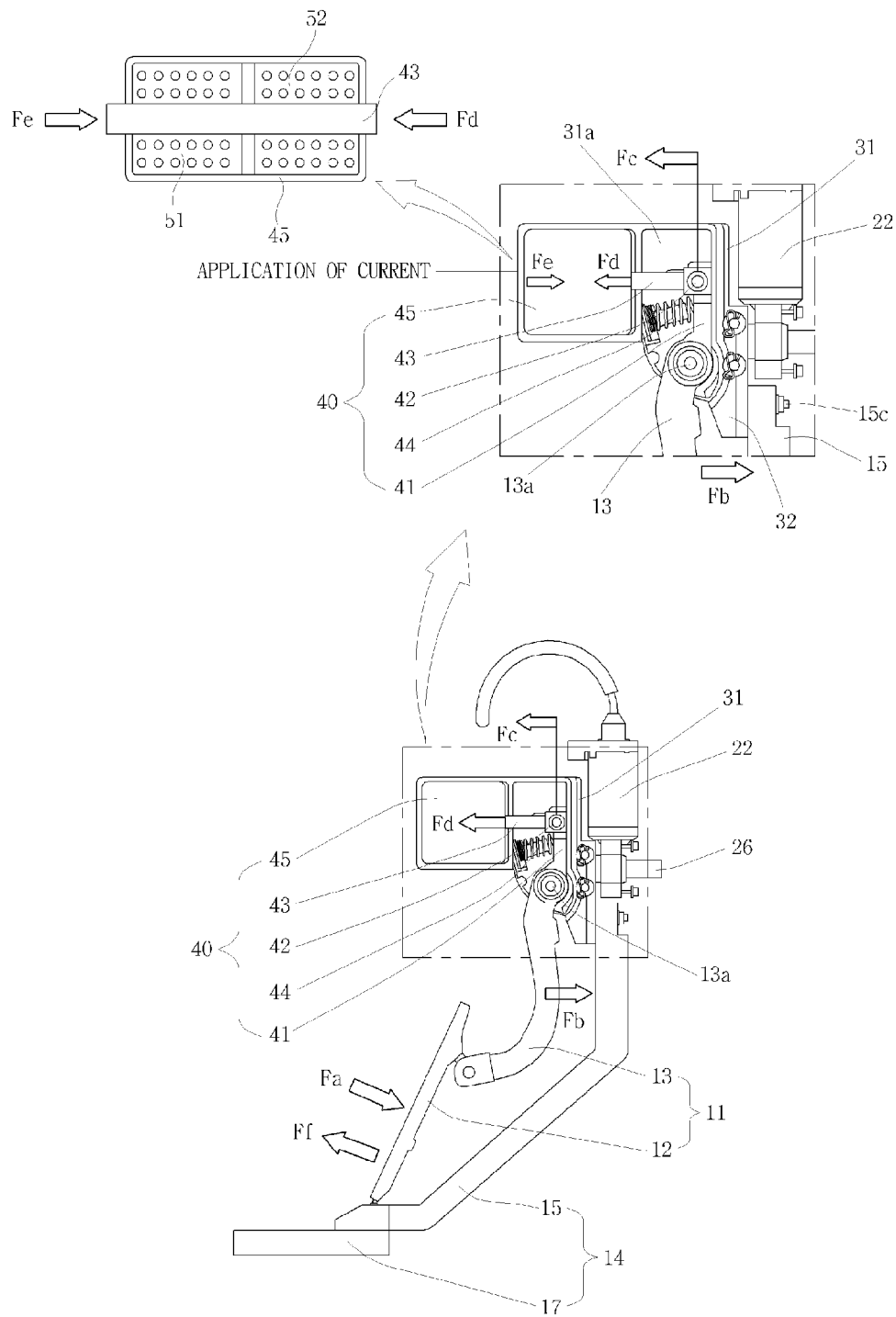
FIG. 10 is a view showing a foot effort mode operation of an exemplary accelerator pedal of the operation mode pendant type adjustment pedal apparatus according to the invention.

FIG. 10 shows the foot effort mode operation of the accelerator pedal apparatus according to various embodiments.

In various embodiments, if an ECU (or other control unit of a vehicle) determines an eco mode, which informs that fuel efficiency may be decreased due to the driver's successive operation of the accelerator pedal during the operation of accelerator pedal 11, the ECU sends a control signal to the sensor housing 60 to supply current to electric mode generating device 45, so that the foot effort mode is performed.

Signals of various sensors, which are mounted on a vehicle so as to detect the condition, are used for the determination of the foot effort mode, and the foot effort mode functions to prevent the unnecessary driver's operation of the accelerator pedal that causes the decrease of efficiency.

As shown in the drawing, when pedal arm 13 is pushed by force Fb by foot plate 12 pressed by force Fa, load applying end 41 pushes load transmission rod 43, which is fixed by connection pin 42, by a force Fc and applies a force Fd to electric mode generating device 45.

Current is supplied to electric mode generating device 45 in the foot effort mode, a solenoid is used as the electric mode generating device 45.

When electric mode generating device 45, which receives force Fd through load transmission rod 43 as described above, generates a reaction Fe in normal and reverse coils 51 and 52 by supplied current.

Reaction Fe, which is generated by electric mode generating device 45 as described above, is reversely transmitted to pedal arm 13 from load applying end 41, and finally applies a force Ff against force Fa to foot plate 12, which is pressed by force Fa, so that a driver feel a reaction. Accordingly, a driver stops the operation of accelerator pedal 11. As a result, the fuel efficiency is improved.

If a driver stops the operation of accelerator pedal 11 and does not step on foot plate 12, pedal arm 13 returns to an original state by an elastic return force that is generated by the return spring 44.

Figure 11:
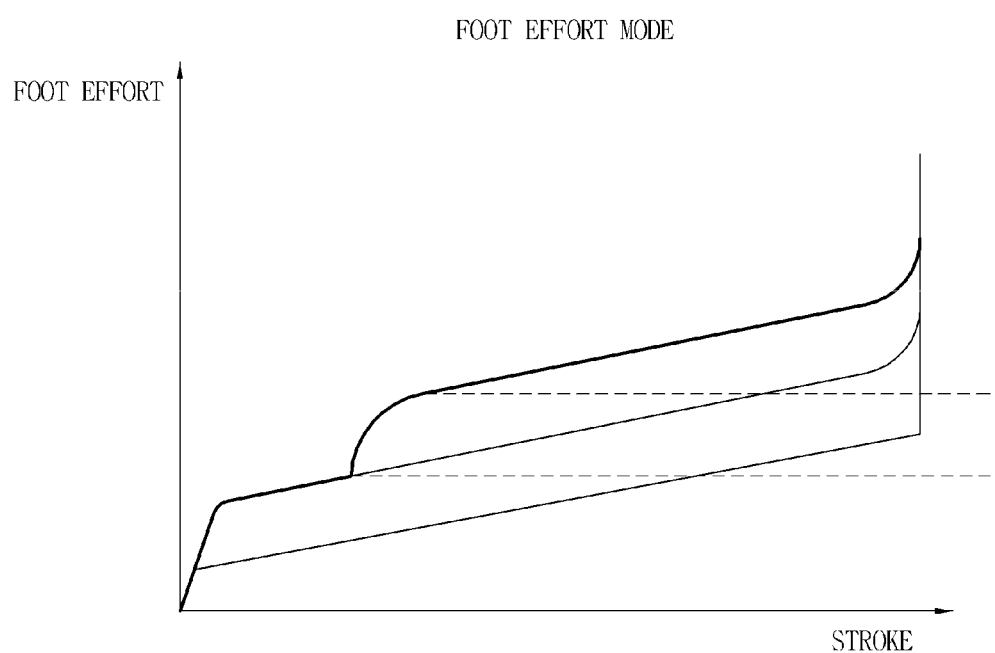
FIG. 11 is a foot effort diagram corresponding to FIG. 10.

It is possible to understand the increase of the reaction in the foot effort mode from FIG. 11 showing a foot effort diagram of a foot effort increased by the reaction Fe that is generated by electric mode generating device 45 and transmitted to accelerator pedal 11.

Figure 12:
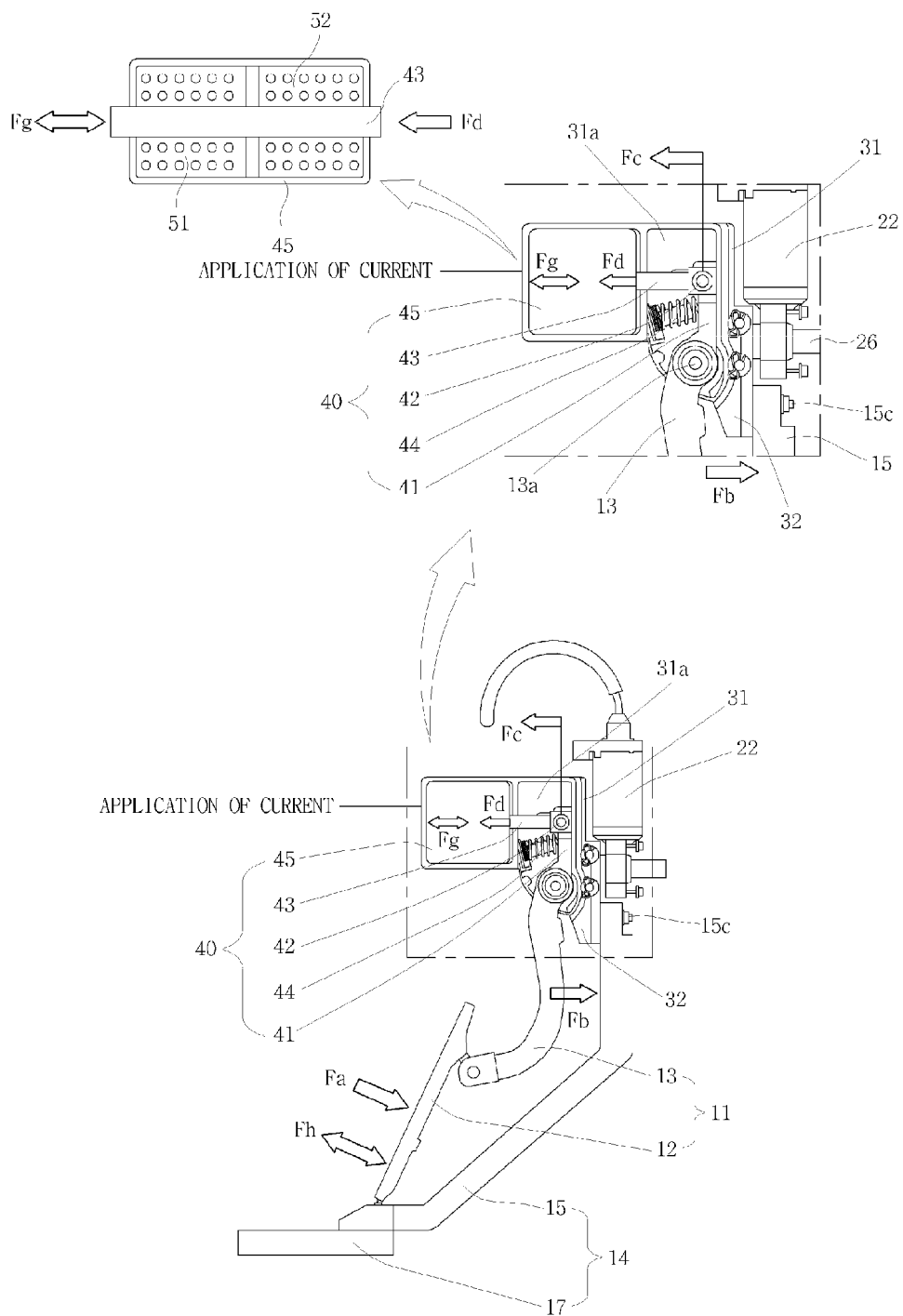
FIG. 12 is a view showing a vibration mode operation of an exemplary accelerator pedal of the operation mode pendant type adjustment pedal apparatus according to the invention.

FIG. 12 shows a vibration mode operation of the accelerator pedal apparatus according to various embodiments.

In various embodiments, if an ECU (or other control unit of a vehicle) determines that a subject vehicle is close to a preceding vehicle, a subject vehicle leaves goes out of a lane, or a driver dozes off at the wheel, the ECU sends a control signal to the sensor housing 60 to supply current to electric mode generating device 45, so that the vibration mode is performed.

Signals of various sensors, which are mounted on a vehicle so as to detect the condition, are used for the determination of the vibration mode, and the vibration mode functions to notify a driver of danger by vibrating the pedal.

As shown in the drawing, pedal arm 13 is pushed by force Fb through foot plate 12 that is pressed by force Fa and load applying end 41 pushes load transmission rod 43, which is fixed by connection pin 42, by a force Fc foot plate and applies a force Fd to electric mode generating device 45. This state means a running state, and a vibration mode determination condition is satisfied in this state.

If a solenoid type electric mode generating device 45, which includes normal coil 51 and reverse coil 52, is used, vibration is generated in the vibration mode by repeatedly supplying current to the electric mode generating device in normal and reverse directions.

However, if a solenoid type electric mode generating device 45 including only normal coil 51 is used, it is possible to obtain the same effect by repeating the operation for intermittently applying a current signal in one direction.

Further, if a linear motor is applied as electric mode generating device 45, it is possible to obtain the same effect from a linear vibration.

Electric mode generating device 45 of various embodiments is a solenoid that includes normal coil 51 and reverse coil 52.

If the direction of current applied to electric mode generating device 45 is repeatedly changed as described above when accelerator pedal 11 is pressed, electric mode generating device 45 generates vibration Fg by the operation of normal coil 51 and reverse coil 52.

The vibration Fg generated by electric mode generating device 45 is reversely transmitted to pedal arm 13 from load applying end 41, and is finally converted into vibration Fh against force Fa that presses foot plate 12 pressed by force Fa.

The repeated vibration Fh, which is applied to accelerator pedal 11 as described above, notifies a driver of danger by making the driver feel vibration. Accordingly, the repeated vibration facilitates stable running.

When the danger has passed and the driver stops the operation of accelerator pedal 11 and does not step on the foot plate 12, pedal arm 13 returns to an original state by an elastic return force that is generated by the return spring 44.

Figure 13:
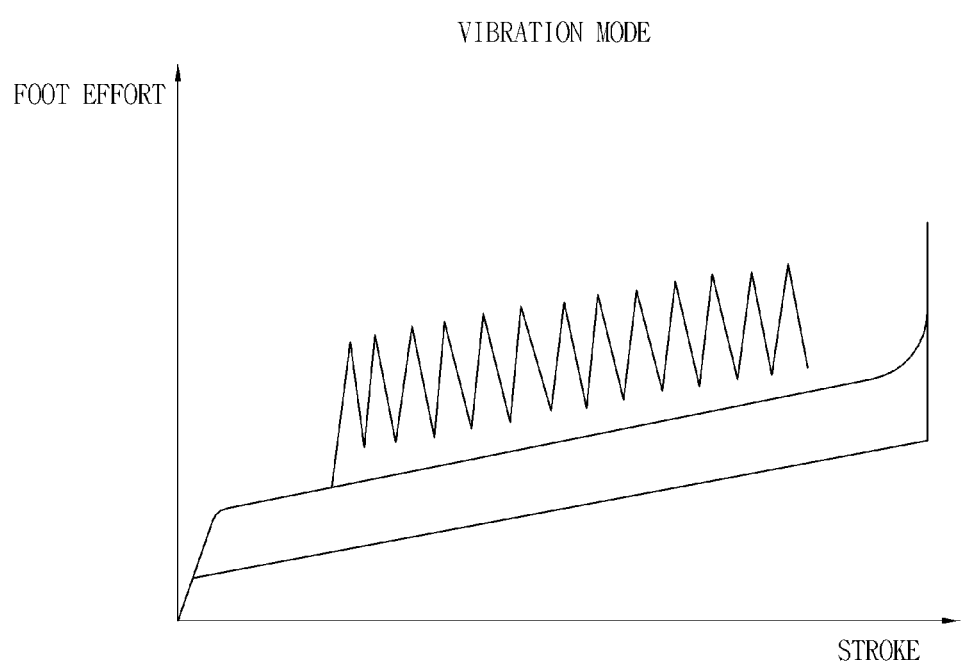
FIG. 13 is a foot effort diagram corresponding to FIG. 12.

It is possible to understand the increase of the reaction in the vibration mode from FIG. 13 showing a foot effort diagram of a foot effort repeatedly vibrated by the vibration Fh that is generated by electric mode generating device 45 and transmitted to accelerator pedal 11.

In various embodiments, pedal reactor 40, which connects accelerator pedal 11 with electric mode generating device 45 and transmits a force between the accelerator pedal and electric mode generating device 45, may be modified in various ways. Accordingly, it may be possible to more efficiently achieve the force transmission performance between accelerator pedal 11 and electric mode generating device 45.

Figure 14:
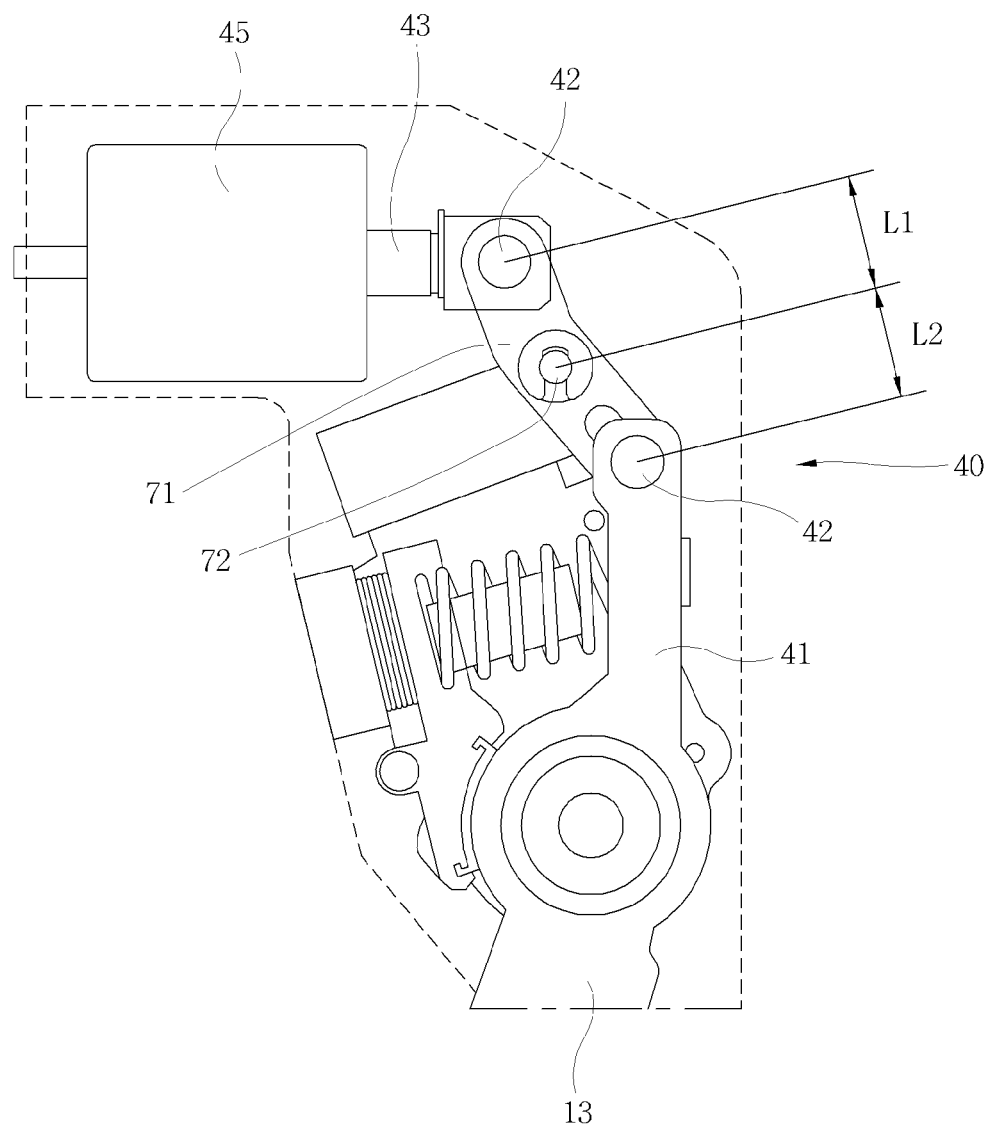
FIG. 14 is a view showing a modification of a force transmission structure of an exemplary accelerator pedal of the operation mode pendant type adjustment accelerator pedal apparatus according to the invention.

FIG. 14 is a view showing a modification of pedal reactor 40 that is a force transmission structure between the accelerator pedal and the electric mode generating device of the operation mode pendant type adjustment accelerator pedal apparatus according to the invention.

As shown in the drawing, this modification further includes an interlink 71 between accelerator pedal 11 and electric mode generating device 45.

The above-mentioned interlink 71 is positioned between load applying end 41 connected to pedal arm 13 and load transmission rod 43 connected to electric mode generating device 45. Accordingly, the interlink has a simple structure without requiring the change of other components.

That is, the middle portion of interlink 71 is fixed by a hinge shaft 71, one end thereof is fixed to load applying end 41 by a connection pin 42, and the other end thereof is fixed to load transmission rod 43 by another connection pin 42. Accordingly, it may be possible to achieve a lever effect that improves a force relationship between the electric mode generating device and the pedal arm.

The both ends of interlink 71 with respect to the hinge shaft 72 are bent to face each other.

Assuming that a distance between the hinge shaft 72 of interlink 71 and load transmission rod 43 connected to electric mode generating device 45 is referred to as a distance L1 and a distance between the hinge shaft and load applying end 41 connected to pedal arm 13 is referred to as a distance L2, the above-mentioned lever effect is achieved by adjusting a ratio L1/L2 of distance L1 to distance L2.

For example, in order to reduce manufacturing cost and weight by reducing the capacity of electric mode generating device 45, a lever effect of interlink 71 about the hinge shaft 72 is generated after increase of distance L2 and the decrease of distance L1. As a result, it may be possible to sufficiently achieve the foot effort mode and the vibration mode of accelerator pedal 11, which have been achieved in various embodiments, by a small-capacity electric mode generating device 45.

As described above, in various embodiments, particularly, the adjustment accelerator pedal apparatus adjusts a pedal clearance by the torque of motor 22, achieves the vibration mode in addition to the foot effort mode, which is an eco mode, on accelerator pedal 11 by electric mode generating device 45, such as a solenoid or a linear motor. Therefore, it is possible to improve fuel efficiency and to provide a danger recognition function using accelerator pedal 11.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An operation mode pendant type adjustment pedal apparatus comprising:
    an adjustment accelerator pedal including an accelerator pedal and an electric mode generating device, the accelerator pedal approaching or being separated from a driver by converting the rotation of a motor driven in accordance with a switch signal into linear movement, and the electric mode generating device achieving at least one mode where a reaction not using a pedal return spring is applied to the accelerator pedal in addition to a normal mode where a foot effort is applied to the accelerator pedal by the pedal return spring;
    an adjuster that supports the accelerator pedal and slides linearly;
    a lead screw that converts the rotation of the motor into linear movement in an axial direction by a worm engaged with a worm gear;
    a mounting housing that fixes the adjuster and the electric mode generating device, receives a load from the lead screw in the axial direction, is moved linearly, and moves the adjuster in the same direction;
    a sensor block communicating with the electric mode generating device and an ECU;
    wherein the pedal return spring is provided between the accelerator pedal and the electric mode generating device and is pressed and compressed by an upper end portion of the operated accelerator pedal about a hinge shaft of the accelerator pedal; and
    a load transmission unit that applies a force to the electric mode generating device through the upper end portion of the accelerator pedal and receives a force from the motor;
    wherein the electric mode generating device is a linear motor;
    wherein the load transmission unit includes;
        a load applying end that forms an upper end portion, which is positioned above the hinge shaft, of a pedal arm and is pushed through the pressing of a foot plate; and
        a load transmission rod that is fixed to the load applying end and transmits the movement of the load applying end to the electric mode generating device;
    wherein the pedal return spring is pressed by the load applying end and transmits a spring reaction to the pedal arm;
    wherein the adjuster includes:
        a slider that is fixed to the mounting housing without restricting the movement of the accelerator pedal, and includes a guider formed at a lower end of the slider, wherein a portion of the guider is combined with the accelerator pedal and at least one guide protrusion is formed at the guider;
        a guide block that guides sliding movement of the slider in a horizontal direction, the guide block including at least one guide channel formed at the guide block for guiding movement of the at least one guide protrusion formed at the guider,
        a return spring that applies an elastic return force to the slider; and
        an interlocking plate that is fixed to the return spring and moves together with the slider in the horizontal direction.

2. The operation mode pendant type adjustment pedal apparatus as defined in claim 1, wherein the at least one mode includes a foot effort mode where the electric mode generating device applies a reaction to the accelerator pedal in one direction and a vibration mode where the electric mode generating device applies a vibration reaction to the accelerator pedal in both directions.

3. The operation mode pendant type adjustment pedal apparatus as defined in claim 1, wherein each of the guide protrusion and the guide channel includes a middle portion and a lower end portion which extends from the middle portion toward both sides.

4. The operation mode pendant type adjustment pedal apparatus as defined in claim 1, wherein the mounting housing further includes a load input block that is threadedly engaged with an end of the lead screw so as to be moved together with the lead screw and includes at least one support pin on both sides thereof, and the support pin is exposed to the outside through at least one guide slot that is formed in a linear shape at both side plates of a main housing in which the load input block is positioned.

5. The operation mode pendant type adjustment pedal apparatus as defined in claim 1, further comprising:

an interlink that is provided between the load applying end and the load transmission rod and adjusts a ratio L1/L2 of a first distance L1 between the hinge shaft and the load transmission rod to a second distance L2 between the hinge shaft and the load applying end.

6. The operation mode pendant type adjustment pedal apparatus as defined in claim 5, wherein both ends of the interlink with respect to the hinge shaft are bent to face each other.

* * * * *